(12) United States Patent
Davidson et al.

(10) Patent No.: US 12,402,231 B1
(45) Date of Patent: Aug. 26, 2025

(54) SYSTEMS AND METHODS FOR CREATING DEVICE NETWORKS

(71) Applicant: Visionary Technologies Limited, Christchurch (NZ)

(72) Inventors: Benjamin Robert John Davidson, Christchurch (NZ); Anthony Freeman Berggren, Christchurch (NZ)

(73) Assignee: Visionary Technologies Limited, Christchurch (NZ)

( * ) Notice: Subject to any disclaimer, the term of this patent is extended or adjusted under 35 U.S.C. 154(b) by 0 days.

(21) Appl. No.: 19/040,819

(22) Filed: Jan. 29, 2025

(51) Int. Cl.
*H05B 47/175* (2020.01)
*H04B 3/54* (2006.01)

(52) U.S. Cl.
CPC ........... *H05B 47/199* (2024.01); *H04B 3/544* (2013.01)

(58) Field of Classification Search
CPC .............................. H05B 47/199; H04B 3/544
USPC ....................................................... 340/12.32
See application file for complete search history.

(56) References Cited

U.S. PATENT DOCUMENTS

| | | | |
|---|---|---|---|
| 6,545,597 B1 | 4/2003 | Blount | |
| 7,397,415 B1 | 7/2008 | Wang et al. | |
| 8,010,038 B2 | 8/2011 | Valentine et al. | |
| 8,437,798 B2 | 5/2013 | Fabien et al. | |
| 8,519,843 B2* | 8/2013 | El-Essawy | H04B 3/56 340/13.23 |
| 8,761,870 B2 | 6/2014 | Mcgree et al. | |
| 8,811,356 B2 | 8/2014 | Howard | |
| 9,009,163 B2 | 4/2015 | Hibino et al. | |
| 9,118,972 B2 | 8/2015 | Maze et al. | |
| 9,123,765 B2 | 9/2015 | Samir et al. | |
| 9,277,872 B2 | 3/2016 | Harlev et al. | |
| 9,356,895 B2 | 5/2016 | Chiu | |
| 10,637,535 B1* | 4/2020 | Vannucci | H04B 3/542 |
| 2011/0121952 A1* | 5/2011 | Bonicatto | H04B 3/54 340/12.32 |
| 2012/0151234 A1 | 6/2012 | Teague et al. | |
| 2018/0219582 A1* | 8/2018 | Scott | H05B 45/32 |

\* cited by examiner

*Primary Examiner* — Juan A Torres
(74) *Attorney, Agent, or Firm* — Holzer Patel Drennan

(57) ABSTRACT

A system may include an initiating device on a power line comprising a Line-In connection and a Line-Out connection. The system may also include a signal generator. One or more downstream devices equipped with processing units may be configured to receive, via the power line, a commissioning signal transmitted from the initiating device via the Line-Out connection to cause the one or more downstream devices to enter a commissioning mode. A system may include wireless communication modules within the one or more downstream devices configured to establish wireless communications with the initiating device autonomously upon entering commissioning mode on receipt of the commissioning signal from the initiating device.

20 Claims, 9 Drawing Sheets

SYSTEMS AND METHODS FOR CREATING DEVICE NETWORKS

TECHNICAL FIELD

Described herein are systems and methods for creating device networks. More specifically, systems and methods are described configured to address challenges of commissioning devices in networked environments, particularly when multiple initiating devices are in close proximity. The systems and methods may be used for commissioning of devices using signals over power lines with initiation coordination and subsequent wireless networking.

BACKGROUND ART

The integration of devices into networked environments, such as smart homes and industrial automation systems, has become increasingly complex. Traditional commissioning methods often require manual interactions, including scanning codes or using specialised applications, which can be cumbersome and error-prone. Moreover, wireless commissioning methods face challenges in accurately targeting specific devices within close proximity, leading to potential configuration errors and security concerns. Additionally, when multiple initiating devices are in close proximity, there is a risk of devices linking to the incorrect initiating device.

Systems and methods for creating light networks are known with varying degrees of success and with their own drawbacks.

For example, with respect to use of powerlines as a trigger mechanism, U.S. Pat. No. 8,010,038 B2 describes methods for controlling devices using PLC but focuses on continuous communication rather than a trigger mechanism. U.S. Pat. No. 9,118,972 B2 describes commissioning devices in a network but does not use power lines as a trigger for wireless communication. U.S. Pat. No. 9,277,872 B2 describes commissioning devices using PLC by sending commissioning data over power lines and relies entirely on PLC for both commissioning and subsequent communication.

The above systems use power lines for continuous data communication and not exclusively only to transmit a commissioning trigger signal. There is no subsequent transitioning to wireless communication post-commissioning.

Further, with respect to physical signal isolation and Line-In and Line-Out, examples of prior publications include U.S. Pat. No. 7,397,415 B2 that describes isolating signals on power lines using electronic components like filters and transformers, not physical separation via Line-In and Line-Out and, U.S. Pat. No. 6,545,597 B1 which describes electronic methods for signal isolation but does not address physical separation through wiring configurations. There is no physical separation of Line-In and Line-Out connections in these publications which creates the need for complex circuitry to achieve signal isolation.

With respect to queuing mechanisms for initiation coordination, US 2012/0151234A1 describes coordination in networks but does not apply a queuing mechanism to the commissioning process over power lines. The focus of this publication is on network traffic management. The described queuing mechanism does not coordinate initiating devices, ensuring downstream devices link to the correct initiating device.

With respect to automatic wireless communication post-commissioning, U.S. Pat. No. 8,761,870 B2 describes a system where smart devices are equipped with both PLC and wireless communication modules. Devices dynamically switch between PLC and wireless communication to optimize data transmission during normal operation. In this publication, PLC is used for continuous data communication and not solely as a commissioning trigger. Further, this publication does not use PLC to initiate wireless commissioning. This publication does not address physical signal isolation via Line-In and Line-Out. This publication focuses on data transmission efficiency and does not address automation during commissioning or reducing user intervention.

U.S. Pat. No. 9,009,163 B2 describes a communication system where devices communicate using both PLC and wireless methods, automatically switching between them for reliability. Despite using both PLC and wireless methods, this publication does not use PLC as a commissioning trigger. This publication lacks a queuing mechanism for initiation coordination. Further, this publication is focused on operational data transmission, not on commissioning.

U.S. Pat. No. 8,437,798 B2 describes a system where devices communicate using both power lines and wireless channels to enhance reliability by transmitting the same data over both mediums. While this system uses both PLC and wireless communication, it does not address device commissioning or use PLC as a trigger. There is no physical signal isolation via Line-In and Line-Out. This publication is focused on data transmission during operation.

U.S. Pat. No. 8,811,356 B2 describes a method for pairing devices in a network using both wired (including PLC) and wireless channels. While this publication addresses device pairing in hybrid networks, the method requires user intervention during pairing. The method does not use PLC as a trigger for automatic commissioning. The method lacks a queuing mechanism.

U.S. Pat. No. 9,356,895 B2 describes systems for securely commissioning wireless devices using wired connections to establish initial trust. The systems uses a wired medium to initiate commissioning and automates transition to wireless communication. This publication does not specifically use power lines or Line-In/Out configurations. It does not mention a queuing mechanism and it focuses on secure key exchange.

The above example publications do not explicitly describe combining a power line trigger with autonomous wireless commissioning and seamless transition where downstream devices automatically transition to wireless communication protocols after receiving the commissioning trigger.

With respect to security protocols and user experience enhancements, U.S. Pat. No. 9,123,765 B2 for example describes security during commissioning but does not describe power line triggers or initiation coordination. The methods described do not incorporate security measures during automatic wireless commissioning.

It may be useful to provide systems and methods configured to offer an intuitive, efficient, and targeted approach to commissioning devices that ensures correct device associations and minimises user intervention, or at least provides the public with a choice.

Further aspects and advantages of the systems and methods will become apparent from the ensuing description that is given by way of example only.

SUMMARY

Described herein are systems and methods configured to address challenges of commissioning devices in networked environments, particularly when multiple initiating devices are in close proximity. The systems and methods may be configured to offer a solution to the challenges of device commissioning in networked environments with multiple initiating devices. The systems and methods may comprise the use of power lines as a commissioning trigger, combined with inherent physical signal isolation and a queuing mechanism for initiation coordination.

In a first aspect, there is provided a system for commissioning of devices connected to a power distribution network, comprising:
   an initiating device on a power line comprising a Line-In connection and a Line-Out connection;
   a signal generator;
   one or more downstream devices equipped with processing units configured to receive, via the power line, a commissioning signal transmitted from the initiating device via the Line-Out connection to cause the one or more downstream devices to enter a commissioning mode; and
   wireless communication modules within the one or more downstream devices configured to establish wireless communication with the initiating device autonomously upon entering commissioning mode on receipt of the commissioning signal from the initiating device.

In a second aspect, there is provided a method for commissioning of downstream devices connected to a power distribution network, comprising:
   selecting a system comprising:
      an initiating device on a power line comprising a Line-In connection and a Line-Out connection;
      a signal generator; and
      one or more downstream devices equipped with processing units configured to receive, via the power line, a commissioning signal transmitted from the initiating device via the Line-Out connection to cause the one or more downstream devices to enter a commissioning mode; and
      wireless communication modules within the one or more downstream devices configured to establish wireless communication with the initiating device autonomously upon entering commissioning mode on receipt of the commissioning signal form the initiating device;
   transmitting a commissioning signal over the Line-Out connection from the initiating device upon user activation;
   receipt of the commissioning signal by the one or more downstream devices connected via Line-Out through their processing units;
   instructing the one or more downstream devices to link specifically to the initiating device from which they received the commissioning signal;
   entering a commissioning mode in the one or more downstream devices upon signal reception;
   establishing a wireless communication protocol by the one or more downstream devices to establish communications with the initiating device autonomously without further user instructions; and
   configuring the one or more downstream devices for network integration without manual user input.

The described systems and method offer a robust solution to the challenges of commissioning devices in networked environments, particularly when multiple initiating devices are in proximity. By utilising intentional signals over power lines with Line-In and Line-Out configurations, which inherently provide signal isolation, and coordination among initiating devices, the system ensures that only intended devices are commissioned and correctly linked to their respective initiating devices. This targeted approach significantly improves the efficiency and accuracy of device integration, enhances user experience by simplifying the setup process, reduces potential errors, and maintains correct device associations. The system and method's broad applicability and compatibility with various communication protocols make it a versatile solution for a wide range of applications.

BRIEF DESCRIPTION OF THE DRAWINGS

Further aspects of the systems and methods will become apparent from the following description that is given by way of example only and with reference to the accompanying drawings in which.

DETAILED DESCRIPTION

Figure 1:
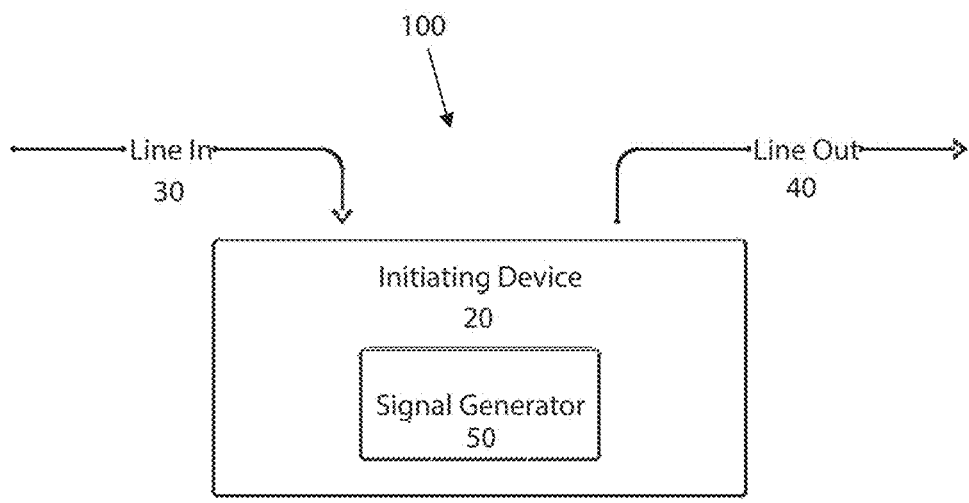
FIG. 1 illustrates a schematic diagram of an embodiment of the system comprising the initiating device with Line-In, Line-Out, and signal generator.

As noted above, described herein are systems and methods configured to address challenges of commissioning devices in networked environments, particularly when multiple initiating devices are in close proximity. The systems and methods may be configured to offer a solution to the challenges of device commissioning in networked environments with multiple initiating devices. The systems and methods may comprise the use of power lines as a commissioning trigger, combined with inherent physical signal isolation and a queuing mechanism for initiation coordination.

For the purposes of this specification, the term 'about' or 'approximately' or 'substantially' and grammatical variations thereof mean a quantity, level, degree, value, number, frequency, percentage, dimension, size, amount, weight or length that varies by as much as 30, 25, 20, 15, 10, 9, 8, 7, 6, 5, 4, 3, 2, or 1% to a reference quantity, level, degree, value, number, frequency, percentage, dimension, size, amount, weight or length.

The term 'comprise' and grammatical variations thereof shall have an inclusive meaning—i.e. that it will be taken to mean an inclusion of not only the listed components it directly references, but also other non-specified components or elements.

System for Commissioning of Devices

In a first aspect, there is provided a system for commissioning of devices connected to a power distribution network, comprising:
- an initiating device on a power line comprising a Line-In connection and a Line-Out connection;
- a signal generator;
- one or more downstream devices equipped with processing units configured to receive, via the power line, a commissioning signal transmitted from the initiating device via the Line-Out connection to cause the one or more downstream devices to enter a commissioning mode; and
- wireless communication modules within the one or more downstream devices configured to establish wireless communications with the initiating device autonomously upon entering commissioning mode on receipt of the commissioning signal from the initiating device.

Method for Commissioning of Downstream Devices

In a second aspect, there is provided a method for commissioning of downstream devices connected to a power distribution network, comprising:
- selecting a system comprising:
  - an initiating device on a power line comprising a Line-In connection and a Line-Out connection;
  - a signal generator; and
  - one or more downstream devices equipped with processing units configured to receive, via the power line, a commissioning signal transmitted from the initiating device via the Line-Out connection to cause the one or more downstream devices to enter a commissioning mode; and
  - wireless communication modules within the one or more downstream devices configured to establish wireless communications with the initiating device autonomously upon entering commissioning mode on receipt of the commissioning signal form the initiating device;
- transmitting a commissioning signal over the Line-Out connection from the initiating device upon user activation;
- receipt of the commissioning signal by the one or more downstream devices connected via Line-Out through their processing units;
- instructing the one or more downstream devices to link specifically to the initiating device from which they received the commissioning signal;
- entering a commissioning mode in the one or more downstream devices upon signal reception;
- establishing a wireless communication protocol by the one or more downstream devices to establish communications with the initiating device autonomously without further user instructions; and
- configuring the one or more downstream devices for network integration without manual user input.

The step of entering a commissioning mode in the one or more downstream devices upon signal reception, may occur manually or automatically.

Commissioning

The phrase 'commissioning' as used herein refers to the process of creating networks, subnets, groups or clusters of:
- an initiating device and one or more downstream devices;
- multiple initiating devices and multiple downstream devices.

Targeting in this context means the selective combining of initiating device(s) and downstream devices to form varied network combinations.

Power Distribution Network

The power distribution network uses electrical power to provide energy to the network components and also optionally to provide electronic signalling.

The system described above may be integrated into circuitry and software of the power distribution network.

The system may be a wireless network.

The system may form a mesh network.

The system may form a thread network. The system may utilise identical thread network ID. All devices in the power distribution network, on power up, may join a local thread network mesh. Other types of network than a thread network may be used and reference herein to a thread network should not be seen as limiting.

The method described may form a network group of the one or more downstream devices governed by the initiating device.

Initiating Device

The initiating device may be configured to send a commissioning signal over a Line-Out power line connection to downstream devices. The power line may be used solely as a trigger mechanism rather than as a continuous communication medium.

The initiating device may be continuously powered.

The initiating device may have a random phase controlled load switch. The random phase controlled load switch may provide signalling to the one or more downstream devices. The random phase controlled load switch may supply power to the one or more downstream devices.

The initiating device may have an encoder and an actuator configured to convert a user input to a commissioning signal from the initiating device e.g. a dial, toggle, switch or push button physically on the initiating device or independent form the initiating device e.g. on a processor that sends a signal remotely to the initiating device. Actuation of the actuator causes transmission of the commissioning signal from the initiating device. The actuator may be a multipurpose actuator.

The initiating device may have an optional momentary contact input.

It may be possible, if pre-defined conditions are met, for the initiating device to (automatically) self-trigger the commissioning signal (i.e. without user instruction/interaction). The conditions to be met to cause self-triggering to occurring may be factory set. For example, self-triggering may only occur if the device is "factory fresh" and in an unconfigured state.

In one embodiment, the initiating device may be a dimmer-type module. The dimmer type module may be similar to a standard rotary dimmer seen in houses and used to dim or brighten lights. This embodiment should not be seen as limiting as the initiating device may take other formats, such as a DIN rail module that has the same/similar electronics inside.

Multiple Initiating Devices

Multiple initiating devices may be used. In this embodiment, one, some or all of the multiple initiating devices may comprise a queuing mechanism. The queuing mechanism may be configured so that, sending of a commissioning signal from one initiating device results in communication with other initiating devices and prevents simultaneous commissioning signal generation from multiple initiating devices and hence, avoid unwanted linking of the one or more downstream devices to an incorrect initiating device. The power distribution network may comprise other initiating devices. The initiating device may communicate with the other initiating devices. Communication may result in one initiating device instructing the other initiating devices not to simultaneously send a commissioning signal and instead, to enter an initiation queue. The initiating device may communicate directly or indirectly with the other initiating devices.

The communication as noted may initiate a queuing process that prevents simultaneous sending of commissioning signals and instead queues each commissioning signal in sequence. The communication between the initiating device and the other initiating devices may comprise communication over a predefined channel to manage the initiation queue and prevent simultaneous initiation.

Coordination Module

At least one coordination module may be used. The at least one coordination module may communicate with the initiating device or initiating devices to manage a queue for initiation timing.

The coordination module may comprise hardware, software, and/or firmware of a computing device. The coordination module may be executed by a processor capable of receiving machine-readable instructions to provide the functionality of the coordination module as described herein. In other examples, the coordination module may comprise an application-specific integrated circuit (ASIC), a field-programmable gate array (FPGA), a complex programmable logic device (CPLD), or other processing architecture.

The coordination module may be configured to prevent simultaneous initiation and maintain associations with the one or more downstream devices and different initiating devices upon initiation of the commissioning signal and subsequent communication between a first and further initiating devices and the one or more downstream devices. Each initiating device may comprise a coordination module. Alternatively, one coordination module may coordinate the actions of multiple initiating devices.

As noted, the power distribution network may comprise multiple initiating devices. The coordination module(s) may act to queue initiating device action and therefore ensure that the desired networks are created between each initiating device and the one or more downstream devices. Each initiating device may wait for its turn to send the commissioning signal. The queue ensures orderly commissioning and correct device associations. Communication between the coordination modules may be via a predefined channel or wireless or wired protocol to manage the queue. This may involve short-range wireless communication or signals over the power line.

The range of the communication module may be limited to only nearby initiating devices. Nearby in this context refers to other initiating devices within communication range. This range may be extended via mesh capability, Initiating devices beyond a communication range effectively act as separate networks. A problem with existing networks of this nature is the way communication between initiating devices and downstream devices can overlap and difficulties in commissioning discrete groups.

The coordination module eliminates this problem by communicating with nearby initiating devices to prevent simultaneous initiation. When the commissioning signal is broadcast, the coordination module(s) communicate causing other initiating devices within communication range to enter a queue, delaying their initialisation process.

Line-In and Line-Out Connection

The initiating device may be linked to a power line and have a Line-In connection supplying power to the initiating device and a Line-Out connection. The Line-In side represents an upstream side of the circuit and the Line-Out side represents a downstream side of the circuit.

The Line-In connection may be an input from a power source. The Line-Out connection may be an output to the one or more downstream devices.

The Line-Out connection is used to send intentional signals exclusively to the one or more downstream devices.

The Line-In connection and the Line-Out connection provide signal isolation. Full signal isolation may be provided by temporarily separating the Line In and Line Out. Signal isolation may prevent the commissioning signal from propagating upstream via the Line-In connection or to unintended circuits. Signal isolation may be useful to ensure that commissioning signals reach only the intended one or more downstream devices.

Signal Generator and Commissioning Signal

In this context, the initiating device generates a commissioning signal that is broadcast via the power line to the one or more downstream devices.

The signal generator generates a specific commissioning signal transmitted via the Line-Out connection when commissioning is initiated. The signal generator may be provided as hardware, software, and/or firmware of a computing device. The signal generator may be executed by a processor capable of receiving machine-readable instructions to provide the functionality of the signal generator as described herein. In other examples, the signal generator may comprise an application-specific integrated circuit (ASIC), a field-programmable gate array (FPGA), a complex programmable logic device (CPLD), or other processing architecture.

The commissioning signal itself may be an electrical signal with a set property of amplitude, frequency, or wave shape. The wave shape if used may be an attenuated wave so as to differ the commissioning signal from normal power transfer. The nature of the electrical signal may be predetermined based on the way the one or more downstream devices receive and process the commissioning signal. The commissioning signal may not interfere with normal power operations.

Downstream Devices

The one or more downstream devices, may comprise a processing unit.

The processing unit may comprise hardware, software, and/or firmware of a computing device. The processing unit may comprise a processor capable of receiving machine-readable instructions to provide the functionality of the processing unit as described herein. In other examples, the processing unit may comprise an application-specific integrated circuit (ASIC), a field-programmable gate array (FPGA), a complex programmable logic device (CPLD), or other processing architecture.

A processing unit may be configured to receive the commissioning signal from the initiating device and on receipt, instruct linking of the downstream device only to the initiating device from which the one or more downstream devices receive the commissioning signal. Each downstream device may comprise a processing unit (such as a microprocessor) capable of receiving and interpreting signals transmitted from the Line-Out connection. This may be important to ensure correct associations between an initiating device and the one or more downstream devices.

More specifically, the one or more downstream devices may comprise processing units that receive the commissioning signal and which are instructed to link only to the initiating device from which the one or more downstream devices receive the commissioning signal. This may be to ensure correct one or more downstream device associations.

In one embodiment, the one or more downstream devices may be an LED light or lights (specifically the lamps' driver/control gear). The one or more downstream devices may be one or more sensors.

The one or more downstream devices may normally be powered by a load switch.

The one or more downstream devices, if not joined to a group, may behave like a normal device so that, when power is applied, the device undertakes the usual action e.g. if the downstream devices is a light, and power is applied, light will be emitted from the light.

The one or more downstream devices if joined to a group, will receive and actuate to commands to set brightness and colour. The commands may be sent from an actuator such as a switch or processor.

After receiving a commissioning signal from the initiating device, the one or more downstream devices autonomously and automatically establish wireless communication with the initiating device.

Commissioning of the one or more downstream devices completes without further user interaction after initiation.

Commissioning Mode

A commissioning mode may be a mode that the one or more downstream devices enters on receipt of a commissioning signal and which actuates the one or more downstream devices to wirelessly link to the initiating device.

More specifically, upon receiving the commissioning signal from the Line-Out connection, the processing unit in the one or more downstream devices interprets the commissioning signal and automatically enters the commissioning mode. When this occurs, the one or more downstream devices links wirelessly specifically to the initiating device from which it received the commissioning signal.

Once linked, the one or more downstream devices may then return to a 'normal' mode of signal transfer via the wireless network formed during the commissioning mode.

As will be described below, multiple groups and clusters of downstream devices may be used in which case, the commissioning mode may not be limited wholly to a single downstream device. There may be multiple downstream devices, one after the other hence some downstream devices may be 'upstream' of other downstream devices.

Wireless Communication Modules

The wireless communication module may use a wireless communication protocol. It is envisaged that almost any wireless communication technology capable of establishing a communication between the initiating device and the one or more downstream devices could be used, existing examples comprising but not limited to protocols such as Bluetooth™, Thread™, Zigbee™, Z-wave™, or Wi-Fi™. The system described herein is highly versatile and not reliant on any one wireless communication protocol.

Groups and Clusters and Joining

All of the one or more downstream devices on the same electrical circuit may be controlled simultaneously as a group.

The controlled one or more downstream devices may be downstream from the initiating device.

Additional initiating devices may be added to the group without having them on the same electrical circuit.

The term 'cluster' as used herein refers to a collection of groups.

The term 'join' refers to the process of joining a group.

Groups may normally be formed from an initiating device.

The initiating device may create the group ID.

Further downstream devices and other initiating devices may join a group.

Legacy Switch and Bulb

The term 'Legacy Switch' as used herein is a generic term for a "dumb" legacy switch that is not network connected.

The term 'bulb' as used herein is a generic term for a "dumb" light emitter that is not network connected.

Potential Applications for the described systems and methods may include:

Use in the design of smart environments. The described system and methods may simplify and ensures correct commissioning of devices in homes, offices, hotels, and industrial settings;

Use in energy management systems. The described system and methods may enhance integration and correct association of smart meters, sensors, and control devices;

Use in building automation. The described system and methods may streamline setup of lighting, HVAC, and security systems with correct device linking;

Use in industrial automation. The described system and methods may facilitate deployment of equipment and sensors in manufacturing processes, ensuring proper device and/or sensor associations.

The described systems and method offer a robust solution to the challenges of commissioning devices in networked environments, particularly when multiple initiating devices are in proximity. By utilising intentional signals over power lines with Line-In and Line-Out configurations, which inherently provide signal isolation, and coordination among initiating devices, the system ensures that only intended devices are commissioned and correctly linked to their respective initiating devices. This targeted approach significantly improves the efficiency and accuracy of device integration, enhances user experience by simplifying the setup process, reduces potential errors, and maintains correct device associations. The system and method's broad applicability and compatibility with various communication protocols make it a versatile solution for a wide range of applications.

The embodiments described above may also be said broadly to consist in the parts, elements and features referred to or indicated in the specification of the application, individually or collectively, and any or all combinations of any two or more said parts, elements or features.

Further, where specific integers are mentioned herein which have known equivalents in the art to which the embodiments relate, such known equivalents are deemed to be incorporated herein as if individually set forth.

WORKING EXAMPLES

The above described systems and methods are now described by reference to specific examples and the following item numbering:

100 Network
20 Initiating device
30 Line-In connection
40 Line-Out connection
50 Signal generator
60 Downstream device Example 1

A simplified system and method are now described with reference to FIGS. 1-5.

Figure 2:
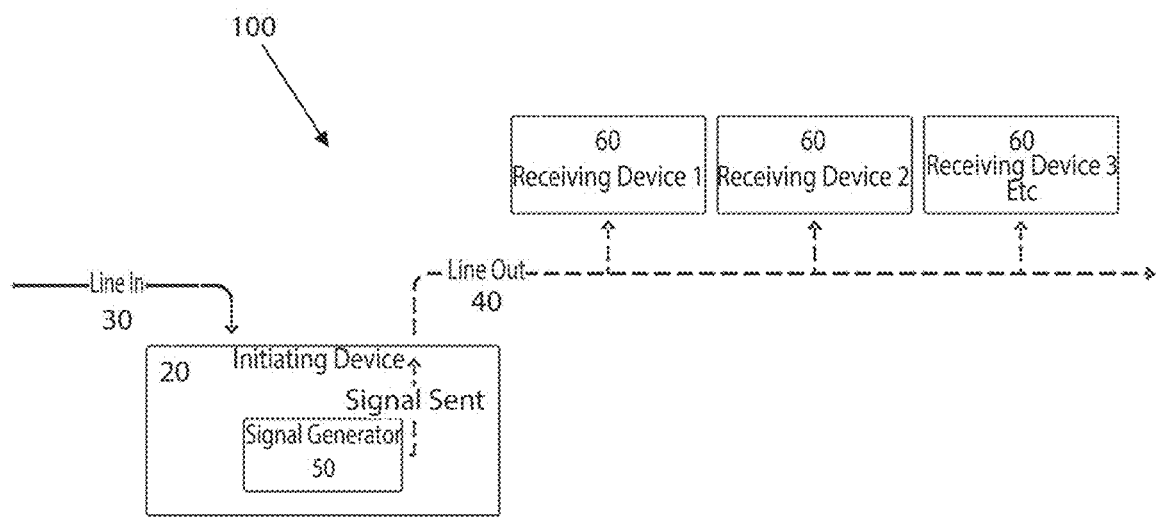
FIG. 2 illustrates downstream devices connected via Line-Out, receiving signals from the initiating device.

The system as shown in FIG. 1 and FIG. 2 comprises a network 100 comprising an initiating device 20 having a Line In 30 and Line Out 40 power line connection. The initiating device 20 comprises a signal generator 50 configured to generate a commissioning signal. Downstream of the initiating device 20 and connected to the Line Out 40 are downstream devices 60. In one example, the initiating device 20 may be a switch and the downstream devices 60 may be lights.

Figure 4:
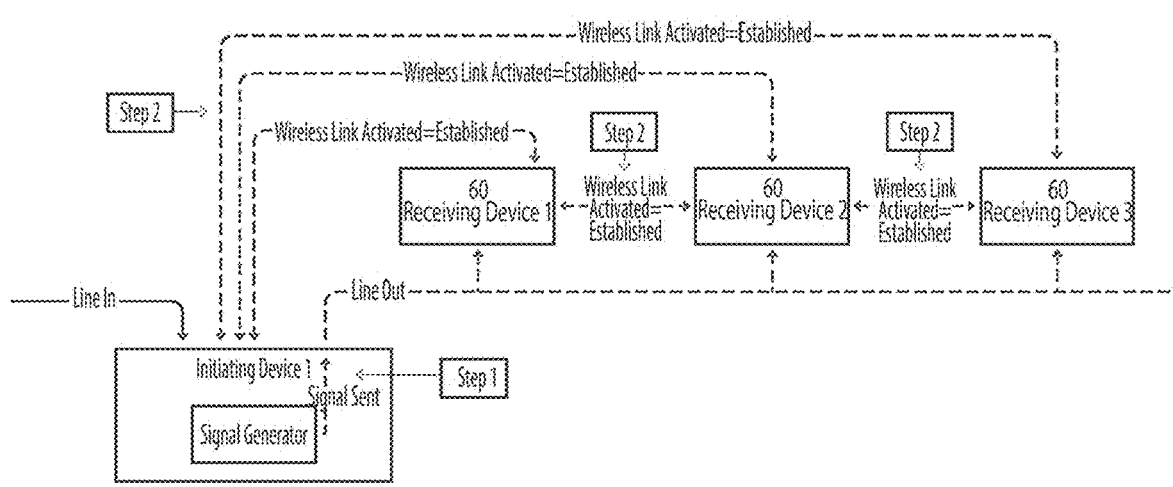
FIG. 4 illustrates a flowchart depicting the signal transmission over power lines and the wireless communication establishment between downstream devices and the initiating device.

FIG. 4 shows an overview of operation of the network 100. Step 1 shown in FIG. 4 shows a commissioning signal being sent from the signal generator 50 of the initiating device 20 via the Line Out connection 40. This commissioning signal triggers the downstream devices 60 via the power line to enter a commissioning mode. Entry into the commissioning mode initiates the use of the wireless communication to the initiating device 20 and other downstream devices 60.

Figure 3:
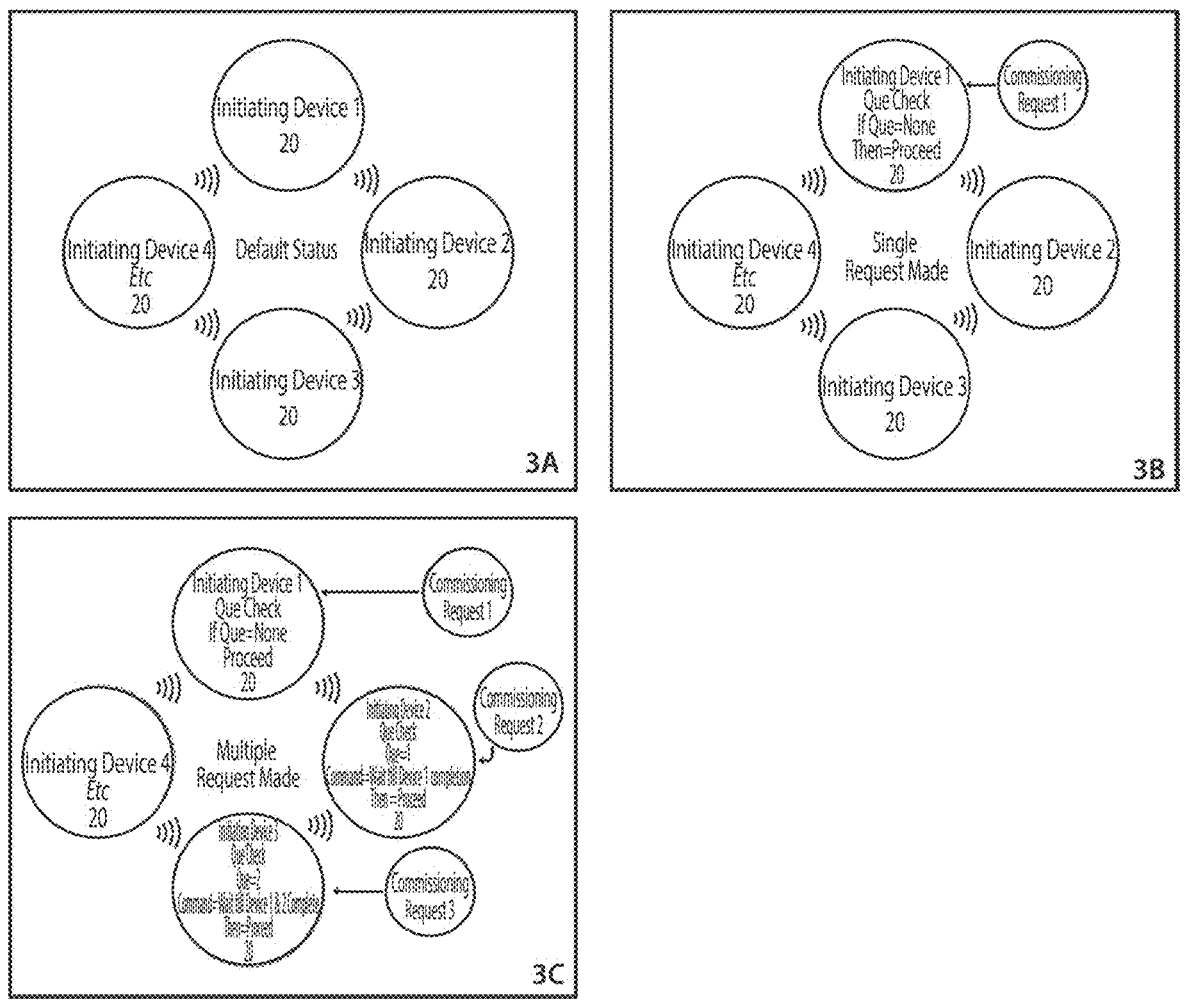
FIG. 3 illustrates a diagram showing coordination between multiple initiating devices (FIG. 3A), coordination where a single initiating device enters a commissioning mode (FIG. 3B) and coordination when multiple initiating devices enter a commissioning mode (FIG. 3C)

FIG. 3 shows how a coordination module may be used to coordinate commissioning where multiple initiating devices 20 may be in communication together. As shown in FIG. 3A, the initiating devices 20 communicate wirelessly together. No commissioning signal is generated until the commissioning module determines that commissioning can proceed. As shown in FIG. 3B, an initiating device 20 may communicate an intent/request to begin commissioning via a commissioning signal to the other initiating devices 20. The coordination module checks against a commissioning queue and confirms to the initiating device 20 that commissioning can occur. If multiple initiating devices 20 attempt to enter a commissioning mode as shown in FIG. 3C, the coordination module may enter each request into a queue so as to prioritise commissioning and not have overlapping commissioning signals and modes entered across different initiating devices 20.

Figure 5:
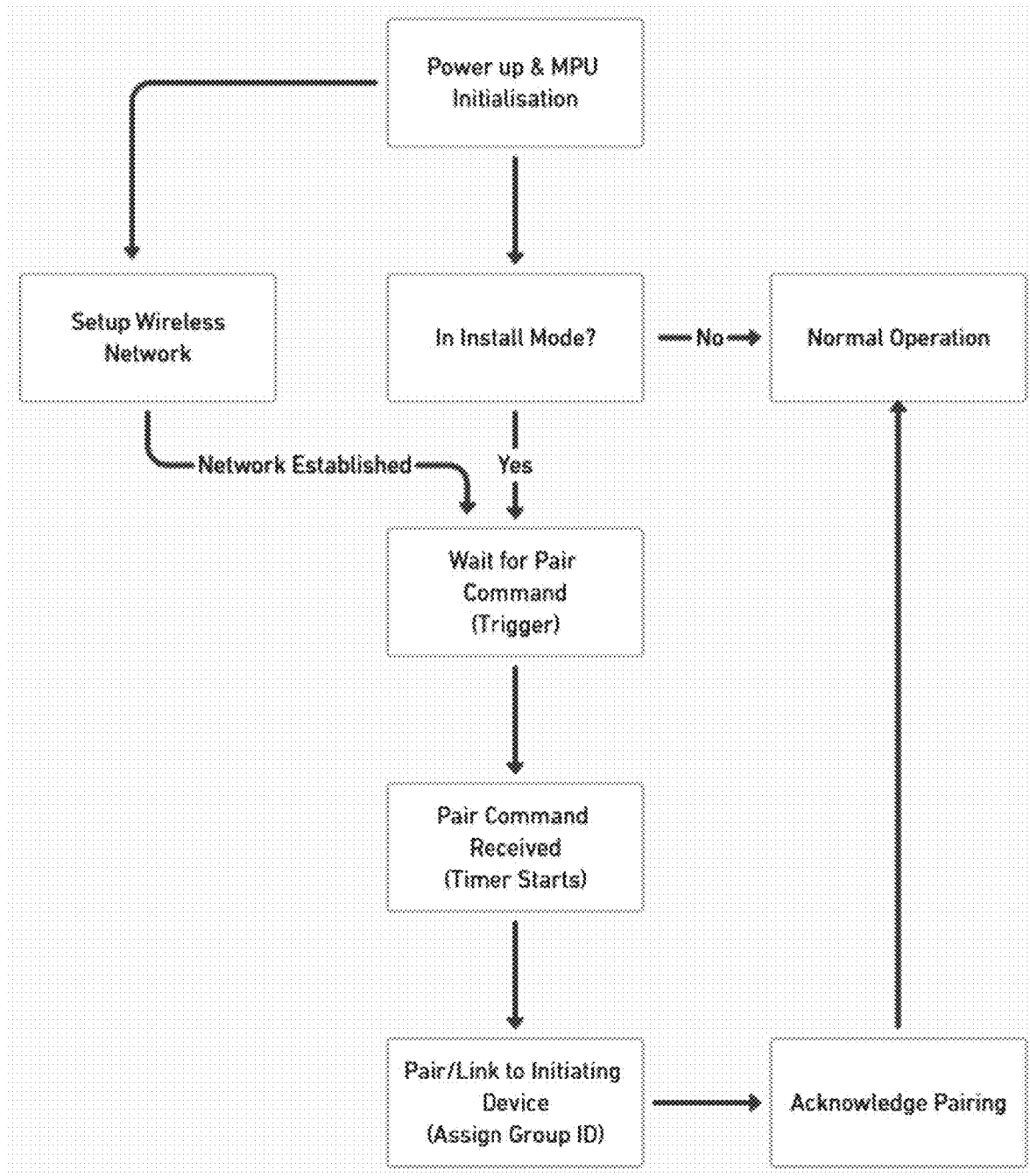
FIG. 5 illustrates a flow process of the system and method of commissioning.

FIG. 5 shows a simplified flow diagram of one method of operation of the system. As shown, the network is initialised and powered up. An install (commissioning mode) may be entered by the initiating device. The downstream devices 60 may wait in an idle mode until the downstream device(s) 60 receives the commissioning signal (e.g. a pair command). When this occurs a timer starts and pair/linking occurs wirelessly with the initiating device and once paired, a 'normal' group operation commences and commissioning mode ends. Where multiple initiating devices are in communication with each other, the initiation may also include set up of a network between the imitating devices and, once set up a coordination module may coordinate commissioning via a queue.

In more detail, the system may be operated via the following method:

User Activation: The user activates the initiating device (e.g., by pressing a button or adjusting a control), triggering the commissioning process. Activation may also occur automatically via an auto-activation mode— e.g. commissioning may self-trigger without user activation.

Signal Transmission via Line-Out: The initiating device transmits the intentional commissioning signal over Line-Out to downstream devices. The configuration of Line-In and Line-Out inherently provides signal isolation, ensuring the signal is confined to downstream devices.

Optional coordination with Nearby Initiating Devices: The initiating device's coordination module communicates with other nearby initiating devices if present. Nearby initiating devices receive a signal instructing them not to initiate simultaneously and to enter a queue. This coordination prevents downstream devices from accidentally linking to the incorrect initiating device.

Signal Reception by Downstream Devices: Downstream devices connected via Line-Out receive the commissioning signal and action on it via their processing and control units. Downstream devices are instructed to link specifically to the initiating device that sent the commissioning signal.

Commissioning Mode Activation: Downstream devices automatically enter commissioning mode upon signal reception.

Autonomous Wireless Communication: Downstream devices establish wireless communications with the initiating device. The initiating device and downstream devices exchange necessary information to complete the commissioning process.

Automatic Configuration: Downstream devices are configured and integrated into the network autonomously. The commissioning process completes without further user intervention.

Visual Feedback: Downstream devices may provide visual cues (e.g., flashing lights) to indicate successful commissioning.

Example 2

The way a network may be formed is now described with reference to the flow diagrams shown in FIG. 6, FIGS. 8A-8B and, FIGS. 9A-9B which are a visualisations of the sequence of a 'smart switch' and downstream lighting commissioning method using the systems described. Note that the item numbers in each step of FIG. 6 and the item letters in each step of FIGS. 8A-8B correspond to the item numbers and item letters in the timeline visualization of FIGS. 9A-9B.

Figure 6:
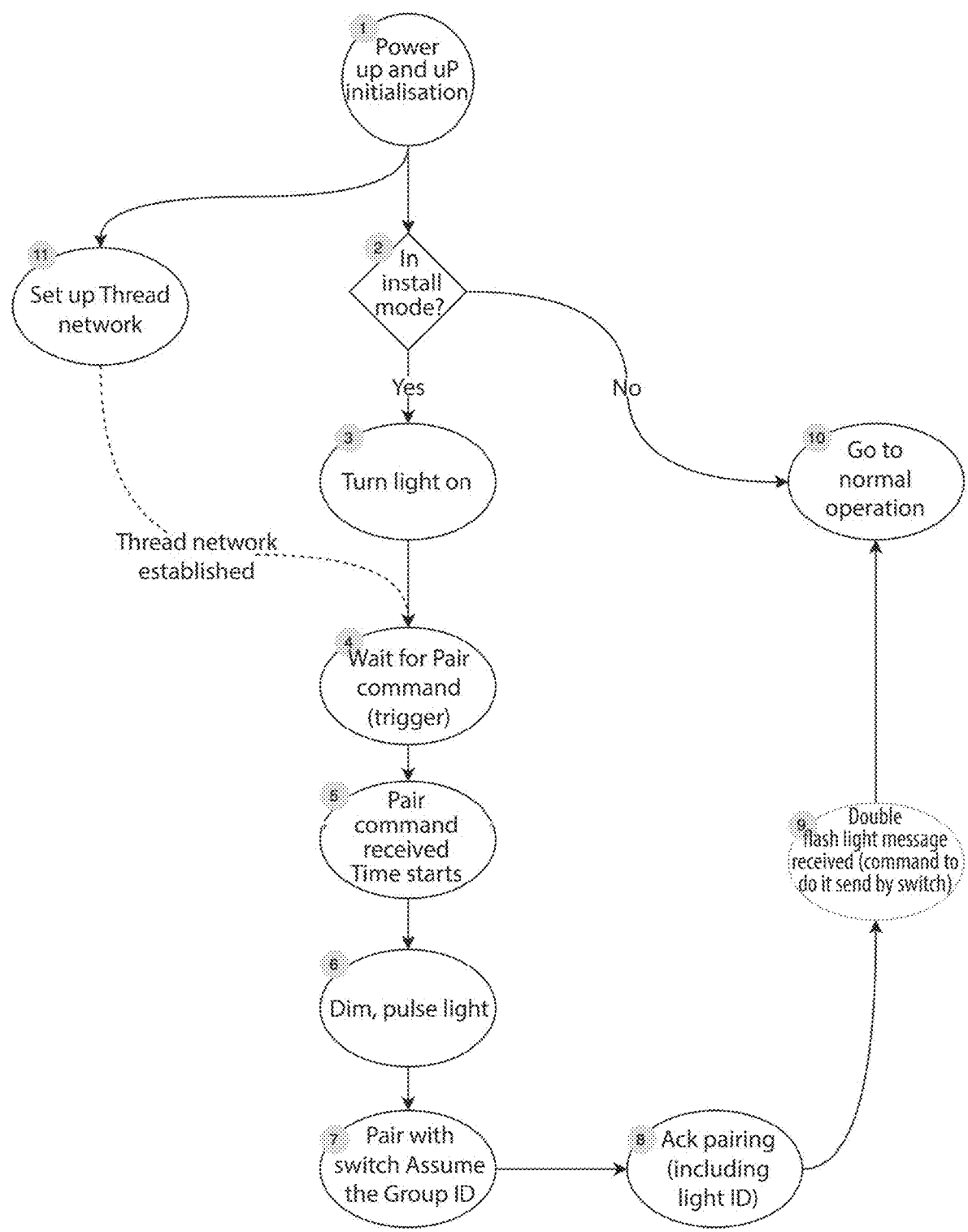
FIG. 6 illustrates a more detailed flow process of the process of joining a light (downstream device) to a group.

Generally, FIG. 6 is a visualization of a method comprising a Step 1 of powering up and uP intialisation; following Step 1, a Step 2 of determining if the system is in install mode; if the answer to Step 2 is no, then proceeding to a Step 10 of going to normal operation; if the answer to Step 2 is yes, then proceeding to a Step 3 of turning the light on; following Step 3, a Step 4 of waiting for pair command (trigger); following Step 4, a Step 5 of receiving the pair command and starting the timer; following Step 5, a Step 6 of dimming, pulsing the light; following Step 6, a Step 7 of pairing with switch and assuming the Group ID; following Step 7, a Step 8 of acknowledging the pairing (including light ID); and following Step 9, a Step 9 of receiving the double flash light message (command sent by switch). Following Step 9, the method may proceed to previously described Step 10 (go to normal operation). The method can further include Step 11 following Step 1 and in parallel with Step 2, Step 11 comprising setting up the thread network so that the thread network is established for Step 4.

Figure 8A:
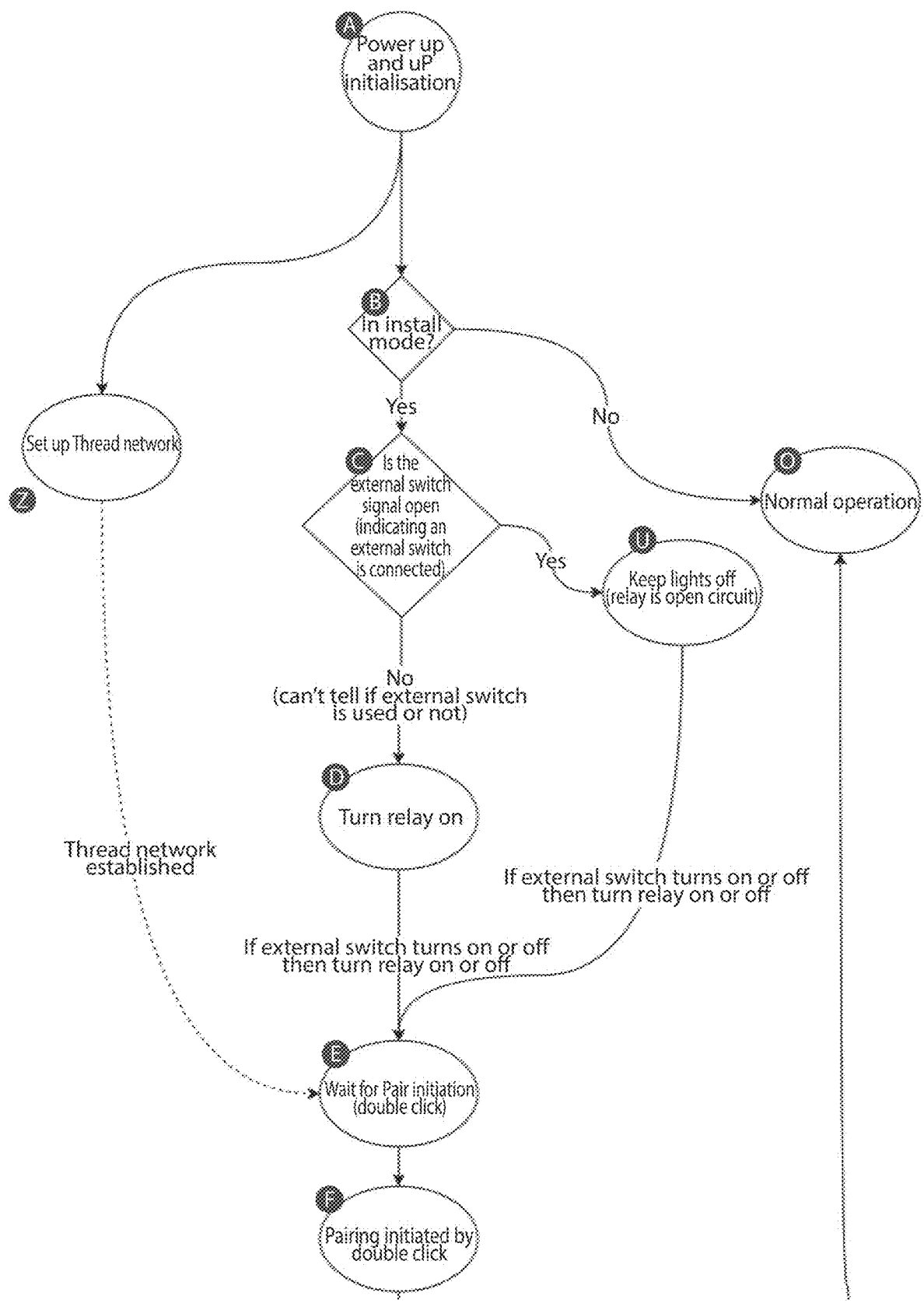
FIGS. 8A and 8B illustrate a detailed flow process of switch group management.
Figure 8B:
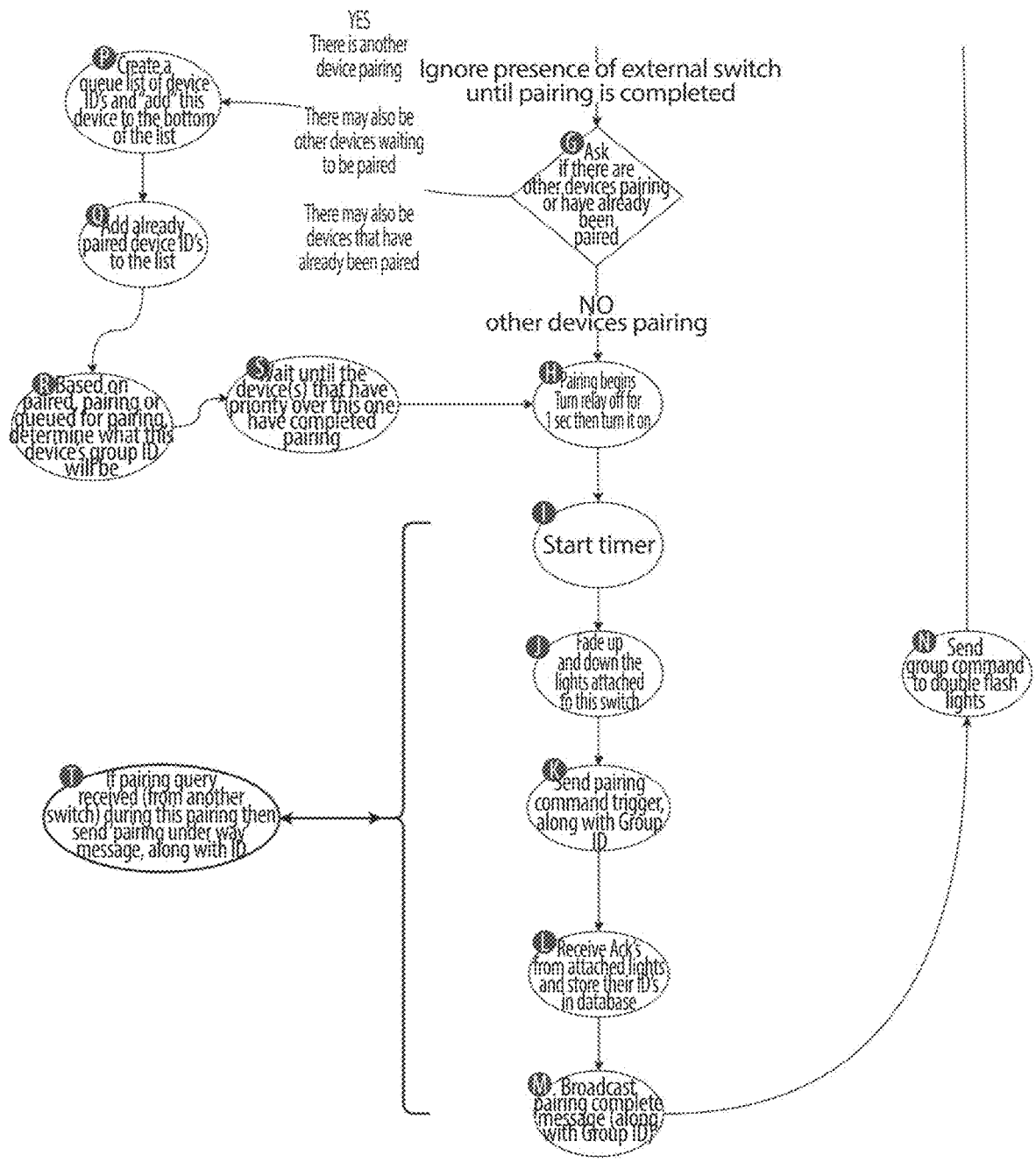
Figure 9A:
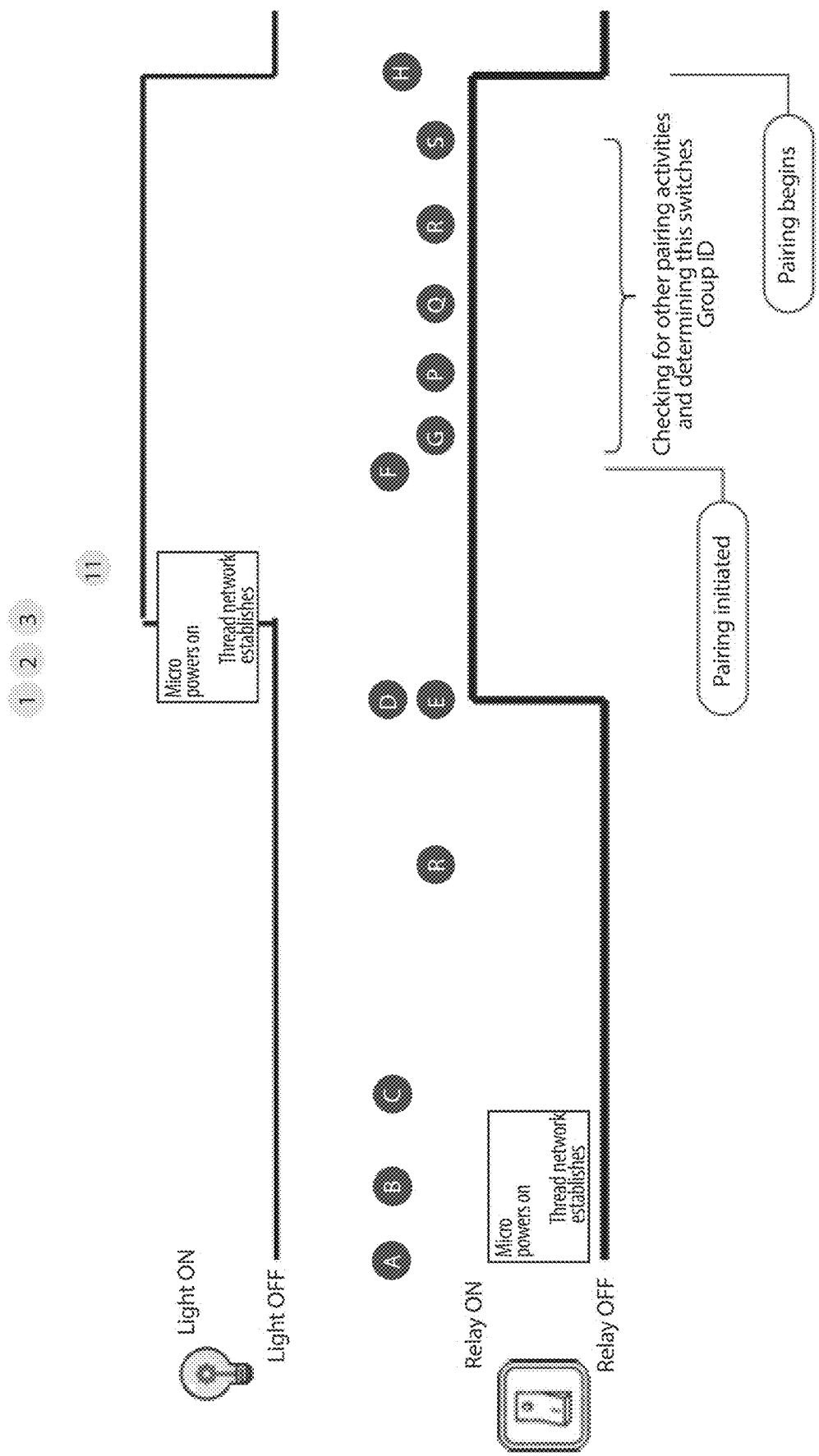
FIGS. 9A and 9B illustrate a timeline simulation for commissioning a group of lights.
Figure 9B:
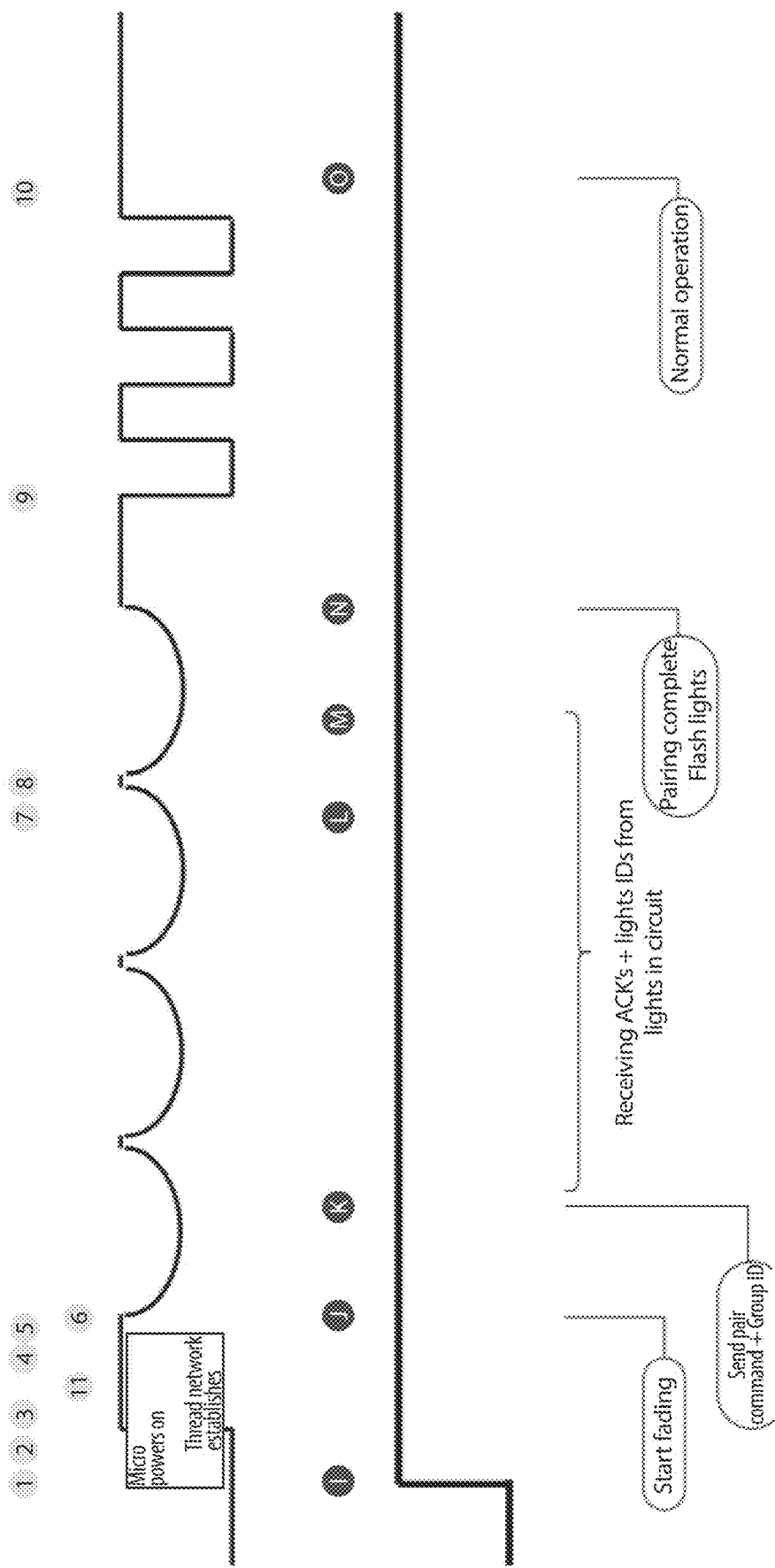

Generally, FIGS. 8A-8B are a visualization of a method comprising a Step A of powering up and uP initialization; following Step A, a Step B of determining if the system is in install mode; if the answer to Step B is no, a Step O of going to normal operation; if the answer to Step B is yes, a Step C of determining if the external switch signal is open (indicating an external switch is connected); if the answer to Step C is yes, a Step U of keeping the lights off (relay is open circuit) and then proceeding to Step E; if the answer to Step C is no (can't tell if external switch is used or not), a Step D of turning the relay on; following Step D, a Step E of waiting for pair initiation (double click); following Step E, a Step F of initiating pairing by double click; following Step F, a Step G of asking if there are other devices pairing or have already been paired; if the answer to Step G is yes (there is another device pairing, there may also be other devices waiting to be paired, and/or there may also be devices that have already been paired), a Step P of creating a queue list of device ID's and "adding" this device to the bottom of the list, and then proceeding to Step Q of adding already paired device ID's to the list, and then proceeding to Step R of, based on paired, pairing, or queued for pairing, determining what this device's group ID will be, and then proceeding to Step S of waiting until the device(s) that have priority over this one have completed pairing, and then proceeding to Step H; if the answer to Step G is no (other devices pairing), a Step H where pairing begins and the relay is turned off for 1 second then turned on; following Step H, a Step I of starting timer; following Step I, a Step J of fading up and down the lights attached to this switch; following Step J, a Step K of sending pairing command trigger, along with Group ID; following Step K, a Step L of receiving acknowledgement from attached lights and storing their ID's in database; following Step L, a Step M of broadcasting pairing complete message (along with Group ID) (during Step I through Step M, Step T comprises if pairing query received (from another switch) during this pairing, then send 'pairing under way' message, along with ID); following Step M, a Step N of sending group command to double flash lights; and following Step N, proceeding to previously described Step O. The method can further include Step Z following Step A and in parallel with Step B, Step Z comprising setting up the thread network so that the thread network is established for Step E.

Initially, a joining mode or commissioning mode may be actuated (step 4 in FIG. 6 and step E in FIGS. 8A-8B and 9A-9B). The user commands the Initiating device (e.g. a switch) to initiate joining mode or this may happen automatically as noted above. This could be by rapidly turning the switch on and off (e.g. three actuations in two seconds), or some other convenient and not-normal action.

Figure 7:
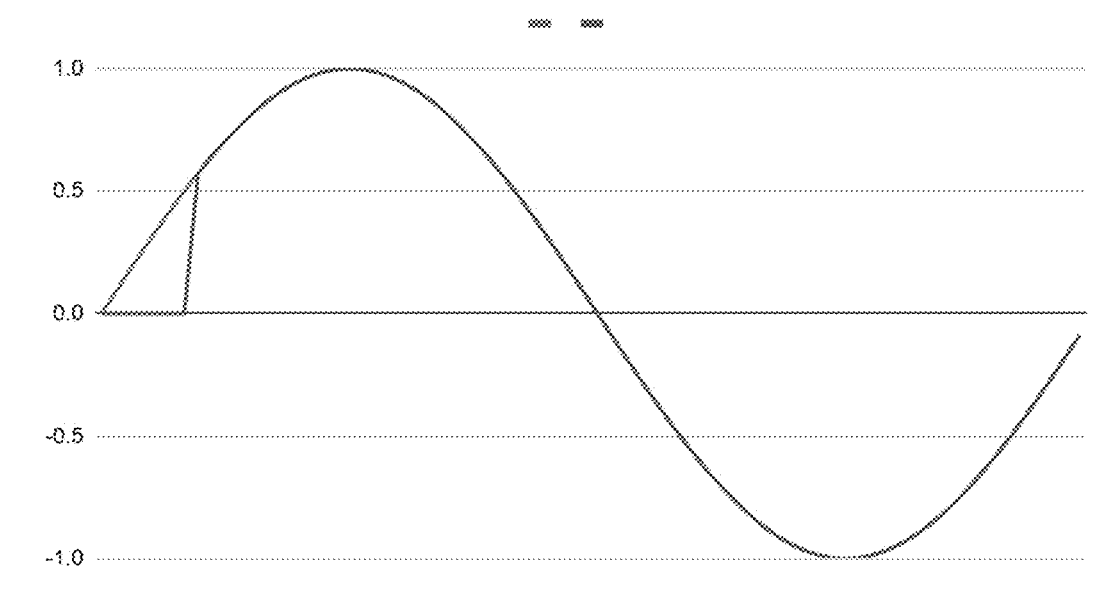
FIG. 7 illustrates an example of a perturbation to the mains signal being a leading edge chop of around 30 degrees.

This causes the switch to broadcast a commissioning signal via the Line-Out connection of the power line. The signal generated may be a perturbation to the mains signal. for example, the perturbation may be a leading edge chop of 30 degrees (see FIG. 7). Enough to be recognised as a perturbation, but not enough to stop the downstream devices e.g. lights, from functioning normally.

On receiving the commissioning signal (e.g. the chopped mains signal described above and as shown in FIG. 7), the downstream devices that can see the commissioning signal report that they are currently seeing a commissioning signal, and how many seconds have elapsed since the downstream devices started seeing the commissioning signal (step 5 in FIG. 6 and step H/I in FIGS. 8A-8B and 9A-9B).

This is then used by the initiating device/switch in this example, to arrange the downstream devices into a group (by sending messages over a wireless network).

In addition, the initiating device may broadcast to other initiating devices that it has initiated a group formation procedure, and how many seconds it has been since the group formation process started.

If a downstream device that has an existing group membership has commissioning mode initiated, but never gets instructed to join a different group, it retains the original group membership.

a) Add Switch to Network

Any other initiating devices/switches on the network that need to be joined to the group can be joined by, for example, pressing the switch four times in rapid succession if there is a switch in the network that is in commissioning mode.

b) Confirmation of Join/Group State

While switches are in a commissioning mode, they may modulate their output/brightness from 10% to 90% (step 6 in FIG. 6 and step J in FIGS. 8A-8B and 9A-9B).

Once they have been directed to join a group, any switches on the group can control the nominal brightness of the lights (downstream devices) in the group. This provides a user with a visual signal to confirm that the lights they want to configure have actually been joined to the group.

c) Removing Lights/Switches from a Group

This might be needed if the wiring is reworked, and a light is moved from a controlled circuit to a dumb switch.

From a switch (initiating device), after entering commissioning mode, another sequence can be initiated (for example, a rapid triple tap on the switch) that then broadcasts to all downstream devices (lights and switches) in the group to forget their group association. Alternatively, it may also be possible to actuate a reset e.g. by pressing down a reset button, e.g. on the light.

d) Exiting Commissioning Mode

Commissioning mode may be exited by pressing a switch on the initiating device that initiated a commissioning mode.

At that point, all initiating devices will be sent the "turn off" command and any voltage modulation of the load switch will be stopped.

Additionally, commissioning mode may be exited after one minute from the last control input on the initiating device.

Light Operation

Light operation (downstream device operation) is described below according to the different modes of operation.

a) Normal Power, No Network

If group has been assigned previously, start in previous state (light on or off). If no network, turn light on.

If no group has been assigned previously, turn light on.

b) Perturbed Power, No Network

Pulsing light, slowly, to indicate no network.

c) Normal Power, Network

Control by commands over thread network. Light is in last state until commands are received.

d) Perturbed Power, Network

Pulsing light, normal speed until joined and commanded to new state

Aspects of the systems and methods have been described by way of example only and it should be appreciated that modifications and additions may be made thereto without departing from the scope of the claims herein.

What is claimed is:

1. A system for commissioning of devices connected to a power distribution network, comprising:
an initiating device on a power line comprising a Line-In connection and a Line-Out connection;
a signal generator;
one or more downstream devices equipped with processing units configured to receive, via the power line, a commissioning signal transmitted from the initiating device via the Line-Out connection to cause the one or more downstream devices to enter a commissioning mode; and
wireless communication modules within the one or more downstream devices configured to establish wireless communications with the initiating device autonomously upon entering commissioning mode on receipt of the commissioning signal from the initiating device.

2. The system as claimed in claim 1 wherein the initiating device comprising an encoder and an actuator configured to convert a user input to a commissioning signal from the initiating device.

3. The system as claimed in claim 1, wherein the Line-In connection and the Line-Out connection provide signal isolation, preventing the commissioning signal from propagating upstream via the Line-In connection to an unintended circuit.

4. The system as claimed in claim 1, wherein the system comprises multiple initiating devices and at least one coordination module and wherein the at least one coordination module communicates with the multiple initiating devices to manage a queue for initiation timing.

5. The system as claimed in claim 4, wherein the at least one coordination module is configured to prevent simultaneous initiation and maintain associations with the one or more downstream devices and different initiating devices upon initiation of the commissioning signal and subsequent communication between a first and further initiating devices and the one or more downstream devices.

6. The system as claimed in claim 4, wherein the at least one coordination module communicates with other nearby initiating devices to manage the queue for initiation timing.

7. The system as claimed in claim 4, wherein each initiating device comprises a coordination module.

8. The system as claimed in claim 1, wherein the one or more downstream devices include processing units that receive the commissioning signal and are instructed to link only to the initiating device from which the one or more downstream devices receive the commissioning signal, ensuring correct one or more downstream device associations.

9. The system as claimed in claim 1, wherein the one or more downstream devices comprise one or more LED lights or one or more sensors.

10. A method for commissioning of downstream devices connected to a power distribution network, comprising:
- transmitting, from an initiating device on a power line comprising a Line-In connection and a Line-Out connection, a commissioning signal over the Line-Out connection from the initiating device upon user activation;
- receiving the commissioning signal via the power line by one or more downstream devices connected via the Line-Out through processing units of the one or more downstream devices;
- instructing the one or more downstream devices to link specifically to the initiating device from which they received the commissioning signal;
- entering a commissioning mode in the one or more downstream devices upon signal reception;
- establishing a wireless communication protocol by the one or more downstream devices to establish a wireless communication between a wireless communication module and the initiating device autonomously without further user instructions; and
- configuring the one or more downstream devices for network integration without manual user input.

11. The method as claimed in claim 10 wherein the Line-In connection and the Line-Out connection on the initiating device inherently isolate the commissioning signal to the one or more downstream devices.

12. The method as claimed in claim 10, wherein the Line-In connection and the Line-Out connection provide signal isolation, preventing the commissioning signal from propagating upstream via the Line-In connection or to unintended circuits.

13. The method as claimed in claim 10, further comprising:
- communicating between at least one coordination module and multiple initiating devices to manage a queue for initiation timing.

14. The method as claimed in claim 10, wherein the one or more downstream devices include processing units that receive the commissioning signal and are instructed to link only to the initiating device from which the one or more downstream devices received the commissioning signal.

15. The method as claimed in claim 10, wherein the method of commissioning of the one or more downstream devices completes without further user interaction after initiation.

16. The method as claimed in claim 10 wherein the power distribution network comprises other initiating devices and the initiating device communicates with the other initiating devices, instructing the other initiating devices not to simultaneously send a commissioning signal and instead, to enter an initiation queue.

17. The method as claimed in claim 16, wherein the communication between the initiating device and the other initiating devices comprises communication over a predefined channel to manage the initiation queue and prevent simultaneous initiation.

18. The method as claimed in claim 16, wherein the initiating device and the other initiating devices communicate using wireless communication or signals over the power line to manage the initiation queue.

19. The method as claimed in claim 10 wherein the initiating device comprises an encoder and an actuator and wherein actuation of the actuator causes transmission of the commissioning signal from the initiating device.

20. The method as claimed in claim 10 wherein the method forms a thread network group of the one or more downstream devices governed by the initiating device.

* * * * *